United States Patent Office 3,824,256
Patented July 16, 1974

3,824,256
PURIFICATION OF α,α-DISUBSTITUTED-
β-PROPIOLACTONES
William A. Ames, Longview, Tex., assignor to Eastman
Kodak Company, Rochester, N.Y.
No Drawing. Filed Dec. 16, 1971, Ser. No. 208,904
Int. Cl. C07d 3/00
U.S. Cl. 260—343.9    14 Claims

ABSTRACT OF THE DISCLOSURE

Polymerization grade α,α-disubstituted-β-propiolactone monomer having the general formula

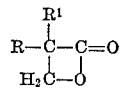

wherein R and R¹ are selected from the group consisting of straight- or branched-chain alkyl groups of from 1 to 10 carbon atoms, substituted or unsubstituted cyclic hydrocarbon groups of from 6 to 10 carbon atoms, or wherein R and R¹ join to form a ring of from 6 to 10 carbon atoms, is effectively obtained from impure monomer containing residual manufacturing impurities by treating the impure lactone monomer with an alkyl ortho-titanate having the formula

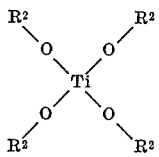

wherein R² is a straight- or branched-chain alkyl group of from 1 to 8 carbon atoms, and distilling the purified monomer from the resultant solution at reduced pressure. The procedure yields a very pure polymerization grade α,α-disubstituted-β-propiolacetone monomer which has a low polymerization index and from which polymer having a high inherent viscosity can be formed.

---

This invention relates to the purification of β-lactones. More particularly, this invention relates to the purification of β-lactones such as, for example, α,α-disubstituted-β-propiolactones by treating the impure material with an effective amount of an alkyl ortho-titanate.

It is well known that β-lactones are important as intermediates for the production of synthetic chemicals, polymer products, pharmaceuticals, and the like. The α,α-disubstituted-β-propiolactones are of particular interest in the high polymer industry since they can be used as starting materials for the production of synthetic resins and fibers which have many novel and desirable properties. However, for the lactones to be useful in the preparation of commercial polymers, they must be of very high purity and quality. Because of their extremely high reactivity due to the strained four-membered ring, the α,α-disubstituted-β-propiolactones cannot be purified by typical procedures used for other monomers. For example, unlike the alkylvinyl ethers, the α,α-disubstituted-β-propiolactones cannot be purified by refluxing over alkali metal because they will polymerize under these conditions. Other compounds frequently used for monomer purification either initiate polymerization of the lactone or are too inefficient.

Various procedures have been disclosed for purifying α,α-disubstituted-β-propiolactones. However, they suffer from the defects of either being quite complicated, laborious, or inefficient. For example, British Pat. 1,122,939, issued to Shell Research, describes a method of purifying pivalolactone by extraction with 2% aqueous $Na_2CO_3$ followed by two extractions with $H_2O$ and triple distillation of the organic phase in the presence of picric acid.

Thus, in view of the aforementioned deficiencies of known methods of purification of α,α-disubstituted-β-propiolactone, a need exists for a simple and effective method of obtaining polymerization grade α,α-disubstituted-β-propiolactone.

Therefore, it is an object of this invention to provide a process for obtaining polymerization grade β-lactones. Another object of this invention is to provide a process for obtaining polymerization grade α,α-disubstituted-β-propiolactones which is simple and produces a high yield of polymerization grade material.

These and other objects and advantages of this invention will become apparent from the following description and appended claims.

In accordance with this invention it has been found that β-lactones, and especially α,α-disubstituted-β-propiolactones having the general formula

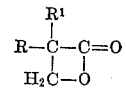

wherein R and R¹ are selected from the group consisting of straight- or branched-chain alkyl groups of from 1 to 10 carbon atoms (i.e., methyl, ethyl, propyl, isopropyl, n-butyl, isobutyl, etc.), substituted or unsubstituted cyclic hydrocarbon groups of from 6 to 10 carbon atoms (i.e., cyclohexyl, benzyl, phenyl, naphthyl, etc.), or wherein R and R¹ join to form a ring of from 6 to 10 carbon atoms (i.e., radicals having the formula

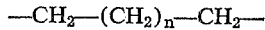

where $n$ is a positive integer of from 3–7, or

or the like), can be effectively purified to yield polymerization grade monomer by treating the impure α,α-disubstituted-β-propiolactone containing residual manufacturing impurities with an alkyl ortho-titanate having the formula

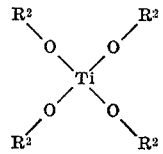

wherein R² is a straight- or branched-chain alkyl group of 1 to 8 carbon atoms, and subsequently distilling the resultant solution at a reduced pressure. In a preferred embodiment R and R¹ represent straight- or branched-chain alkyl groups of from 1 to 4 carbon atoms. This procedure will yield a very pure polymerization grade α,α-disubstituted-β-propiolactone monomer which possesses a low polymerization index and from which a polymer having a high inherent viscosity can be formed. When used in this specification, polymerization index is considered to be simply a measure of the purity and polymerizability of the monomer. Typically, for pivalolactone, it is defined as the time (in seconds) required for ten grams of pivalolactone containing 0.50 ml. of 0.0100N tetrabutylammonium iodide in acetone to begin polymerizing when placed on a steam cone in an aluminum moisture dish. As will be appreciated, high molecular weight polymer can be made only from very pure monomer, hence, monomer with a low polymerization index is very desirable. Thus, monomer suitable for polymerization should exhibit a very low polymerization index, preferably less than 15 seconds, since, generally, the lower the value of the polymerization index the greater the monomer purity.

Suitable α,α-disubstituted-β-propiolactones that can be purified in accordance with this invention include α,α-dimethyl-β-propiolactone (pivalolactone);
α,α-diethyl-β-propiolactone;
α,α-dipropyl-β-propiolactone;
α,α-diisopropyl-β-propiolactone;
α,α-dibutyl-β-propiolactone;
2-ethyl-2-methylhydracrylic acid β-lactone;
2-(2,2-dimethyloctyl)-2-methylhydracrylic acid β-lactone;
2-(2-ethylhexyl)-2-ethylhydracrylic acid β-lactone;
2-cyclohexyl-2-propylhydracrylic acid β-lactone;
2-phenyl-2-methylhydracrylic acid β-lactone;
2-benzyl-2-methylhydracrylic acid β-lactone;
2,2-pentamethylene-β-propiolactone, and the like. These may be prepared by the general method described in Kung, U.S. Pat. 2,356,459, dated Aug. 22, 1944, wherein a dialkyl ketene is reacted with formaldehyde.

Many alkyl ortho-titanates are commercially available, including tetramethyl titanate, tetraethyl titanate, tetra-n-propyl titanate, tetraisopropyl titanate, tetrabutyl titanate, tetrakis-(2-ethylhexyl)titanate, and tetrastearyl titanate. All these titanates are useful for purification of the lactones in accordance with this invention, as are other alkyl ortho-titanates. Preferred titanates are, however, the titanates, such as tetraisopropyl titanate, which are miscible with the lactone, as contrasted to others, such as tetrakis(2-ethylhexyl)titanate, which are not. Thus, the use of the miscible alkyl titanates eliminates the necessity of constantly agitating the lactone-titanate solution.

The quantity of alkyl ortho-titanate necessary to purify the α-α-disubstituted-β-propiolactone depends upon the type and purity of the monomer and the particular alkyl ortho-titanate selected. For example, approximately one percent by weight of tetraisopropyl titanate is required to reduce the polymerization index of pivalolactone from 90 second to less than 10 seconds. Larger amounts of the tetraisopropyl titanate give essentially the same results, whereas lesser amounts do not reduce the polymerization index to the desired level, i.e., below 15 seconds. If the polymerization index of the starting pivalolactone is greater than 90 seconds, then more of the alkyl ortho-titanate is required to accomplish the same result, and vice versa. Also, the amount of alkyl ortho-titanate required increases as the molecular weight of the alkyl ortho-titanate used increases. The exact amount of the alkyl ortho-titanate necessary for purification in a particular situation can be readily determined in the laboratory using the procedure described in Example 3 of this specification. However, for pivalolactone having a polymerization index from about 45 to 120 seconds, 0.5 to 10 weight percent of the ortho-titanate is sufficient. It should be noted that excess amounts of the alkyl ortho-titanate can be used with no adverse results.

In practice, a weighed amount of the impure lactone is treated with a predetermined quantity of the alkyl ortho-titanate and the purified monomer is subsequently separated from the resultant mixture. A preferred method is by vacuum distillation. In the context of this invention, the impure lactones will normally analyze approximately 99% pure by gas chromatography and have a polymerization index of from about 45 seconds to 120 seconds or greater. The treatment of the impure lactone monomer with the alkyl ortho-titanate is carried out at essentially room temperature and under an inert atmosphere such as nitrogen. Any gas may be used as long as it is inert to the reactants.

As mentioned hereinbefore, when miscible alkyl ortho-titanates such as tetraisopropyl titanate are used, a single liquid phase will be formed. The purified monomer may then be obtained by flash vacuum distillation until only an oily residue remains. The distilled monomer will exhibit a low polymerization index and can be used to prepare high molecular weight polymer. In contrast, when tetrakis(2-ethylhexyl)titanate is used with pivalolactone, two immiscible layers will form. This mixture must be vigorously stirred to allow the titanate to contact the impurities sufficiently well to react with them. The purified lactone may then be obtained by filtration, centrifuging, or by flash vacuum distillation. In either instance, temperature is relatively unimportant. It has been found, however, that polymerization of the high purity lactones may occur if the temperature of the monomer is permitted to rise above a limiting temperature. Thus, the base temperature of the flash vacuum distillation unit should not be permitted to exceed this limiting temperature. For example, this temperature is 63° C. for pivalolactone.

This invention will be further illustrated by the following examples of preferred embodiments. It will be understood that these examples are included merely for purposes of illustration and are not intended to limit the scope of the invention.

Inherent viscosity, when referred to in these examples, is measured at 25° C. in 60/40 phenol/tetrachloroethane at 0.5 grams per 100 cc. concentration.

EXAMPLE 1

Pivalolactone is synthesized by any of the known procedures to yield a monomer having a polymerization index of 55 seconds. Two hundred grams of the impure monomer and 16 grams of tetrakis(2-ethylhexyl)titanate are charged to a 500 ml., 4-necked, round bottom flask fitted with a stirrer, thermowell, condenser, and glass stopper. The flask is purged with dry $N_2$. Its contents, which have separated into two phases with the titanate in the upper layer, are stirred vigorously for 5 minutes. The stirrer is removed and the flask set up for flash vacuum distillation. The monomer is distilled at 45° C. at 10 mm. The yield of monomer purified is 187.5 grams (93.75%). The polymerization index of the purified monomer is 8 seconds. The inherent viscosity of the polymer made during the determination of the polymerization index is 0.93.

The residue remaining in the distillation flask is an oily liquid material. No solid material is formed.

EXAMPLE 2

Two hundred grams of impure pivalolactone monomer having a polymerization index of 90 seconds is charged to a 500-ml., round bottom flask along with 4.49 grams of tetraisopropyl titanate. The lactone and titanate are miscible. The flask is set up for flash vaccum distillation. Purified monomer is distilled at 40° C. and 6 mm. pressure. The yield of purified monomer recovered is 186.5 grams (93.25%). The polymerization index of the purified monomer is 9 seconds. The polymer obtained in the polymerization index test is tough, indicating high molecular weight. It is analyzed and found to contain less than 9 p.p.m. titanium. The inherent viscosity of the polymer is 1.09.

EXAMPLE 3

Impure pivalolactone monomer is treated with various amounts of tetraisopropyl titanate by the same procedure given in Example 2. The results obtained are shown in Table I.

TABLE I.—PURIFICATION OF PIVALOLACTONE WITH TETRAISOPROPYL TITANATE

| Weight of impure pivalolactone monomer, grams | Weight of tetraisopropyl titanate, grams | Initial polymerization index, seconds | Polymerization index after treatment, seconds |
|---|---|---|---|
| 100 | 0 | 90 | 90 |
| 100 | 8 | 90 | 8 |
| 100 | 4 | 90 | 8 |
| 100 | 2.5 | 90 | 9 |
| 100 | 1.1 | 90 | 7 |
| 100 | 0.5 | 90 | 50 |

These results show that approximately one weight percent tetraisopropyl titanate is needed to make extremely pure, polymerization grade monomer from impure pivalolactone having an initial polymerization index of 90 seconds.

In none of the experiments is polymer formation noted in the distillation flask. Only an oily liquid residue remains.

EXAMPLE 4

Comparison of Results Obtained with Polymerization Grade Pivalolactone and Monomer of Approximately 99 Percent Purity Two hundred fifty milliliters of hexane dried over Linde 3A molecular sieves is charged to a dry, 500-ml., round botom flask which is fitted with a stirrer, reflux condenser, and $N_2$ bubbler. The flask is purged with $N_2$ and kept under positive $N_2$ pressure throughout the polymerization. Twenty-five grams of pivalolactone, purified by the tetraisopropyl titanate treatment described in this invention and having a polymerization index of 12 seconds, is charged to the flask. One-tenth milliliter of 0.10N tetrabutylammonium iodide initiator in acetone is added. The contents are heated to reflux for 24 hours with stirring. White polymer powder begins to precipitate soon after the initiator is added. The polymer is filtered, washed with acetone, and dried in a vacuum oven. The inherent viscosity of the polymer is 2.02.

The same experiment is repeated except the pivalolactone monomer used is not treated with tetraisopropyl titanate. The polymerization index of the impure monomer is 82 seconds. The inherent viscosity of the polymer is only 0.41. The polymer with an inherent viscosity of 2.02 would be useful in film, fiber, and molding plastics applications. The polymer with an inherent viscosity of 0.41 is essentially worthless. It is brittle and of low molecular weight.

The novelty and utility of this invention can be further appreciated when compared with several alternate procedures which were examined for purification of the lactones. For example, pivalolactone was stirred over calcium oxide for 24 hours and filtered. The polymerization index before treatment was 90 seconds, and after treatment was 65 seconds. Similar treatment with barium oxide reduced the polymerization index from 90 seconds to 80 seconds. Likewise, pivalolactone was stirred over $CaH_2$ and distilled at reduced pressure. The polymerization index decreased from 90 seconds to 53 seconds. Numerous other alternate procedures were likewise discarded because of either minimal effectiveness or high cost.

The invention has been described in detail with particular reference to certain preferred embodiments thereof, but it will be understood that variations and modifications can be effected within the spirit and scope of the invention.

I claim:

1. A process for purifying an impure α,α-disubstituted-β-propiolactone having the formula

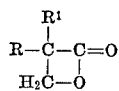

wherein R and R¹ individually are straight- or branched-chain alkyl of from 1 to 10 carbon atoms whereby said impure α,α-disubstituted-β-propiolactone is treated with from about 0.5% to about 10% by weight, based on the weight of the impure α,α-disubstituted-β-propiolactone monomer, of an alkyl ortho-titanate having the formula

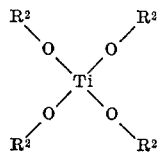

wherein R² is a straight- or branched-chain alkyl of 1 to 8 carbon atoms, and purified α,α-disubstituted-β-propiolactone monomer is subsequently separated from the resultant mixture.

2. A process of Claim 1 wherein each of R and R¹ is a straight- or branched-chain alkyl of from 1 to 4 carbon atoms.

3. A process according to Claim 1 wherein the α,α-disubstituted-β-propiolactone is pivalolactone.

4. A process according to Claim 1 wherein the alkyl ortho-titanate is selected from the group consisting of tetramethyl titanate, tetraethyl titanate, tetra-n-propyl titanate, tetraisopropyl titanate, tetrabutyl titanate, tetrakis(2-ethylhexyl)titanate, and tetrastearyl titanate.

5. A process of Claim 1 wherein the alkyl ortho-titanate is tetraisopropyl titanate.

6. A process of Claim 1 wherein the alkyl ortho-titanate is tetraethyl titanate.

7. A process of Claim 1 wherein the alkyl ortho-titanate is tetramethyl titanate.

8. A process according to Claim 1 wherein the separation of the purified monomer is accomplished by vacuum distillation.

9. A process for producing a polymerization grade pivalolactone monomer having a polymerization index of less than 15 seconds whereby from about 0.5% to about 10% by weight, based on the weight of pivalolactone monomer, of an alkyl ortho-titanate having the formula

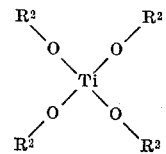

wherein R² is a straight- or branched-chain alkyl of 1 to 8 carbon atoms, is added to impure pivalolactone monomer having a polymerization index greater than 15 seconds and polymerization grade pivalolactone is subsequently separated from the resultant mixture.

10. A process of Claim 9 wherein the separation of the purified pivalolactone is accomplished by vacuum distillation.

11. A process of Claim 9 wherein the alkyl ortho-titanate is selected from the group consisting of tetramethyl titanate, tetraethyl titanate, tetra-n-propyl titanate, tetraisopropyl titanate, tetrabutyl titanate, tetrakis(2-ethylhexyl)titanate, and tetrastearyl titanate.

12. A process of Claim 9 wherein the alkyl ortho-titanate is tetraisopropyl titanate.

13. A process of Claim 9 wherein the alkyl ortho-titanate is tetraethyl titanate.

14. A process of Claim 9 wherein the alkyl ortho-titanate is tetramethyl titanate.

References Cited

UNITED STATES PATENTS 3,448,122   6/1969   Klootwijk _____ 260—343.9

OTHER REFERENCES

Chemical Abstracts, vol. 62, 1965, 9311g relied on.

DONALD G. DAUS, Primary Examiner

A. M. T. TIGHE, Assistant Examiner